Patented Aug. 22, 1950

2,520,098

UNITED STATES PATENT OFFICE 2,520,098

PROCESS FOR PREPARING PURE, CRYSTAL-
LINE PENICILLIN SALTS

Edward B. Hodge, Terre Haute, Ind., assignor to
Commercial Solvents Corporation, Terre Haute,
Ind., a corporation of Maryland No Drawing. Application August 3, 1946,
Serial No. 688,345

15 Claims. (Cl. 260—302)

1

This invention relates to a process for preparing pure penicillin material, and more particularly to a method for preparing such pure penicillin material in the crystalline state in the form of its salts.

In copending application of Murray Senkus, Serial No. 575,555, filed January 31, 1945, there is described a method for preparing pure ammonium penicillin from dry impure concentrates thereof, and a method for converting the pure ammonium penicillin into other pure penicillin salts.

I have now found that pure, crystalline penicillin salts, such as ammonium penicillin, substituted ammonium penicillins, potassium penicillin, sodium penicillin, and rubidium penicillin may be prepared directly from impure aqueous solutions thereof according to my invention, which involves a simple salting-out of the penicillin under acid conditions from an aqueous solution to an organic solvent, utilizing as the salting-out agent a water-soluble alkali-metal, alkaline-earth-metal, or ammonium salt having an inorganic anion, followed by neutralization with a suitable alkaline compound, depending on the final product desired, dehydration, concentration, and finally crystallization, all as hereinafter described.

Among the substituted ammonium penicillins of my invention may be mentioned methylammonium penicillin, diethylammonium penicillin, trimethylammonium penicillin, choline penicillin, and benzyltrimethylammonium penicillin.

In the currently used method for the recovery of penicillin from culture liquors in which it is produced, the liquor is variously treated to purify and concentrate it and eventually to obtain it in the form of a relatively concentrated but still impure water solution. The aqueous penicillin salt solution thus obtained is then frozen and dried from the frozen state, and this dry material is stored under refrigeration for subsequent administration upon re-solution in water.

One prior-art method for obtaining the aqueous solutions of penicillin described above involves the steps of filtering the culture liquor, adsorbing the penicillin on active carbon, eluting the penicillin with an aqueous-organic solvent mixture, evaporating the organic solvent, acidifying and extracting the aqueous penicillin-containing residue with a water-immiscible organic solvent such as amyl acetate, and then re-extracting the amyl acetate with an aqueous alkaline solution. Other methods involve extraction of the filtered culture liquors with an organic

2 solvent, followed by multiple-step extractions, alternately into organic solvents and aqueous alkaline solutions.

In carrying out my invention, I prepare an aqueous solution of penicillin salts according to the prior-art methods, for example, by re-extraction of the amyl acetate solution of penicillin described above with an aqueous alkaline solution, preferably using such quantity of the alkaline solution as will produce a final pH within the range of about 6 to 8. I may then concentrate it by known means, as by another series of solvent extractions, or preferably by low-temperature distillation under reduced pressure, to a concentration around 15,000 Oxford units of penicillin activity per milliliter or higher. Such an intermediate concentrating step is not essential to my process, but is desirable in order to economize on the quantity of salting-out agent required.

To the aqueous penicillin salt solution thus prepared, I add a salting-out agent and an organic solvent, each having certain characteristics that will be clearly set forth below. The volume of organic solvent used is not critical, but should preferably be somewhat less than the volume of the aqueous penicillin solution treated, so that a degree of concentration of the penicillin is effected at this stage. The aqueous solution is acidified, either before or after addition of the organic solvent, with an acid such as orthophosphoric acid, to a pH between about 2 and 4, and preferably between about 2 and 3, either at room temperature, or preferably after being cooled somewhat below room temperature. After being thoroughly mixed, the liquids are allowed to separate into two layers, of which the organic-solvent layer contains the major part of the penicillin. The organic-solvent layer is then separated, and the acid form of penicillin therein is converted into a penicillin salt or salts by treatment with an alkaline compound of the appropriate cation, depending on the penicillin salt being prepared, preferably to a pH around 7.0. For this purpose, the hydroxides, carbonates, and bicarbonates are suitable; and alkaline buffering agents, such as phosphates, are also operative, but are less desirable because they tend to contaminate the product. The neutralizing agent may be added in any desired manner, for example, as an aqueous solution, or as an aqueous solution diluted with an organic solvent, or preferably as a solution in an organic solvent. It will be obvious that the use of an organic solution for the neutralization avoids the addition of water, which should preferably be removed for best results in the ensuing crystallization.

The organic-solvent solution is next distilled, preferably under reduced pressure and at temperatures below about 40° C., to remove any water dissolved therein and until the concentration of penicillin-salt in the residual solvent is at least as great as the concentration required to saturate the solvent at ordinary temperatures, or until crystallization begins, as evidenced by clouding of the liquid. The actual penicillin concentration at this point will vary, depending on the type of penicillin being processed, and on the type and quantity of impurities present.

The concentration step of my invention may be carried out at low pH levels if the temperature is kept low, preferably below 40° C., and under such circumstances the concentration should be carried out as quickly as possible. Best results in the crystallization step are obtained at near-neutral pH levels; but I have obtained acceptable results at substantially higher and lower levels. The crystallization step is operative to some degree under conditions as acid as pH 4 and as alkaline as pH 8.5.

Higher temperatures may be employed during the distillation step, particularly if the distillation is carried out at near-neutral pH levels; but in such case the length of time during which the solution is exposed to such temperatures should be held to a minimum, as by use of a so-called "flash" distillation, for example, in a falling-film evaporator, in order to minimize the decomposition of penicillin.

After the solution has been dehydrated and suitably concentrated, crystals usually begin to form immediately at ordinary room temperatures. Crystallization may be hastened and rendered more nearly complete by neutralizing, if neutralization was not carried out prior to the dehydration and concentration step, and by cooling, and to this end it is usually desirable to cool the solution down to about 5° C. and allow it to crystallize at this temperature. After crystallization, the crystals may be separated in any desired manner, for example, by filtering, washing, and drying.

Alternatively, I may choose to prepare the crystalline penicillin salts by evaporating the organic solvent substantially completely under reduced pressure at low temperatures. In this modification of my invention, I prefer to measure the organic solution accurately into serum vials, and to evaporate the solution to dryness under a pressure of about 10–40 mm. Hg and at temperatures below about 40° C.

Suitable salting-out agents for use in my process include any water-soluble alkali-metal, alkaline-earth-metal, or ammonium salts having inorganic anions, such as the sodium, potassium, ammonium, barium and calcium chlorides, sodium, potassium and ammonium sulfates, sodium bromide, sodium phosphate, and the like.

The quantity of salting-out agent used is not particularly critical, but should be sufficient to cause the preponderant proportion of penicillin to seek the organic-solvent phase in preference to the water phase. Usually a quantity sufficient to form about a 25% solution of salting-out agent in the water layer is ample, although larger quantities can be used if desired; and such larger quantities up to sufficient to produce a saturated solution results in forcing greater proportionate quantities of penicillin into the organic-solvent layer.

Solvents suitable for use in my process to effect extraction of the acid form of penicillin from aqueous solutions and subsequent crystallization of the penicillin salts include all of the organic solvents for penicillin salts described in the copending application referred to above which are immiscible with aqueous solutions of the acid form of penicillin in the presence of the salting-out agents described above. It is desirable also that the solvents be stable under the acid conditions employed in the extraction step of my process.

Particularly adapted for my purpose is the group of organic liquids that may be described as "hydrophilic," that is, either miscible with water in the absence of my salting-out agents, or capable of dissolving at least about 3 to 5% of it. A number of classes having operative members are given in the following list: alcohols, aldehydes, ketones, acetals, cyclic acetals, ketals, cyclic ketals, cyclic ethers, hydroxy ethers, hydroxy esters, and keto esters. As specific examples of the foregoing classes of solvents may be cited ethanol, n-propyl alcohol, isopropyl alcohol, n-butyl alcohol, secondary butyl alcohol, tertiary butyl alcohol, n-hexyl alcohol, capryl alcohol, n-octy alcohol, 2-ethylhexyl alcohol, diethylcarbinol, allyl alcohol, diacetone alcohol, cyclohexanol, acetone, ethyl methyl ketone, cyclohexanone, benzaldehyde, dimethyl acetal, 1,3-dioxolane, 2,2-dibutoxypropane, 2,2,4,5-tetramethyl-1,3-dioxolane, 1,4-dioxane, butyl cellosolve, butyl lactate, and methyl levulinate.

While the various types of solvents described are satisfactory for use in my invention, I prefer to use the alcohol solvents, both of the type strictly classified as alcohols, such as the normal alcohols, secondary alcohols, tertiary alcohols, saturated and unsaturated alcohols, straight-chain and cyclic alcohols, and the like; and also those compounds which, though not always strictly classified as alcohols, contain alcohol or hydroxyl groups, and include hydroxy esters, hydroxy ethers, and the like. Therefore, wherever the term "alcohol" is used in the claims, it should be construed to include all the alcohol-type compounds described above, as well as the compounds usually included in the term "alcohols."

Of the various solvents, I prefer to use the lower-aliphatic alcohols because of their ready availability, and the high yields of crystals obtainable therefrom.

I may also carry out the extraction with any solvent for the acid form of penicillin that is immiscible with the acidified aqueous penicillin solution, and then, prior to concentrating and crystallizing, add any solvent for penicillin salts chosen from the group cited in the copending application referred to above, whether water-immiscible or not, and distill out the solvent initially used. For this purpose, the second solvent should obviously have a boiling point near to or higher than the first solvent and in any event must be capable of forming, during distillation, a vaporous mixture comprising a substantial proportion of the first solvent.

For the satisfactory application of my process to the preparation of pure, crystalline sodium penicillin, I find it desirable to start with a relatively pure sodium penicillin concentrate. The yield of crystalline sodium penicillin tends to be greatly reduced by the presence of any substantial quantities of organic impurities in the solution in which the crystallization is carried out, and the effect varies somewhat, depending on the nature of the impurities. Ordinarily, however, I am able to crystallize sodium penicillin successfully from an organic-solvent solution of impure sodium penicillin having a potency as low as 900 units per milligram of dissolved solid.

Prior to the crystallization step of my process, I have found it advantageous to treat the penicillin solutions at one or more of the various stages with a small proportion of an active charcoal, an active magnesium silicate, or other material of the type commonly referred to as decolorizing agents, thereby removing substantial proportions of impurities of unknown composition which tend to retard crystallization. This treatment may be carried out by slurrying the decolorizing agent with the penicillin solution and subsequently filtering and washing the filter cake with a small quantity of clean solvent. I prefer to carry out this treatment in an organic solution, since the loss of penicillin from organic solutions during the treatment is substantially less than from aqueous solutions.

The term "pure" as used herein to describe the crystalline penicillin salts of my invention is not used in its absolute sense to designate a material completely free from all impurities. Accordingly, wherever the term "pure" appears as relating to penicillin salts, it should be construed as designating a purity of at least about 85% of the theoretical purity of the particular type of penicillin designated, measured in terms of Standard units of penicillin activity per milligram of solids, as assayed against the U. S. Food and Drug Administration standard established March 25, 1944, and based on crystalline sodium penicillin G, having an arbitrarily ascribed antibiotic activity of 1650 units per milligram of solids against the organism Staphylococcus aureus. The standard unit referred to is an arbitrary unit established by the U. S. Food and Drug Administration. (A. C. Hunter and Wm. R. Randall, "Standardization of Assay of Penicillin," J. Assoc. of Official Agricultural Chemists, August, 1944, pp. 430–438.) While this unit is not precisely the Oxford unit, it is so close to it as to be well within the experimental error of the assays used; and for lack of a precise name, this unit is more or less universally referred to as synonymous with the Oxford unit.

The following specific examples will further illustrate my invention:

Example I

To 500 ml. of an impure aqueous solution of ammonium penicillin assaying 59,000 Oxford units of penicillin per milliliter were added 100 ml. of n-butyl alcohol and 150 grams of sodium chloride. To this solution phosphoric acid was added with stirring until the pH reached 2.5. From the resulting two-phase system, 142 ml. of n-butyl alcohol layer, assaying 172,000 Oxford units per milliliter, were separated. To the n-butyl alcohol solution of penicillin was added a solution of aqueous ammonium hydroxide in n-butyl alcohol until the pH reached 7. The neutralized solution was distilled under reduced pressure at a temperature of 25° C. to a volume of 25 ml., whereupon copious crystallization of pure ammonium penicillin occurred. The crystals were filtered, washed with two 10 ml. portions of n-butyl alcohol, then with 50 ml. of acetone, and dried in air for one-half hour, yielding 7.75 grams of pure ammonium penicillin assaying 1731 Oxford units per milligram and representing a conversion of 46%, based on the original impure aqueous ammonium penicillin solution.

Example II

To 100 ml. of impure aqueous solution of potassium penicillin assaying about 30,000 Oxford units per milliliter were added 100 ml. of n-butyl alcohol and 30 grams of potassium chloride. The pH of the solution was adjusted to 2.5 with phosphoric acid. The resulting two-phase system was separated. The upper (n-butyl alcohol) layer, now containing the penicillin, was distilled under reduced pressure at a temperature of 35° C. to a volume of 25 ml. The concentrated solution was then neutralized to a pH of 7 with a saturated solution of potassium hydroxide in n-butyl alcohol, whereupon crystals of potassium penicillin formed which, upon being filtered, washed, and dried, weighed 0.5589 g. and assayed 1400 Oxford units per milligram, amounting to a conversion of 39%.

Example III

A solution of 5 grams of potassium penicillin in 100 milliliters of water was stirred for ten minutes with 35 grams of sodium chloride. Fifty milliliters of n-butyl alcohol were then added, the pH was adjusted to 2.5 with 20% phosphoric acid, and the n-butyl alcohol layer was separated, filtered, and adjusted to pH 7.0 with aqueous 20% sodium hydroxide. An additional 20 milliliters of n-butyl alcohol were then added, and the solution was concentrated at low temperature and pressure until crystallization started. Pure, crystalline sodium penicillin weighing 3.9064 g. and assaying 1460 units per milligram was isolated.

Example IV

A solution of 15 grams of potassium penicillin in 300 milliliters of water was stirred for ten minutes with 105 grams of sodium chloride. To the solution were then added 150 ml. of n-butyl alcohol, the mixture was adjusted to pH 2.5 with 20% phosphoric acid, and the n-butyl alcohol layer, measuring 166 ml., and assaying 103,350 units per milliliter, was separated, filtered, and adjusted to pH 7.0 with aqueous 20% sodium hydroxide. Two-milliliter portions of the n-butyl alcohol solution were dispensed into serum vials, and the solvent was evaporated substantially completely at low temperature and pressure, giving 216,000 units of crystalline product per bottle, assaying 1375 units per milligram.

Example V

Three liters of a n-butyl acetate solution of the acid form of penicillin assaying 1485 units per milliliter were treated with 30 grams of Darco G–60. The resulting slurry was filtered, and the filter cake was washed with 500 ml. of fresh n-butyl acetate. The combined filtrate and washings were extracted to pH 7.3 with a mixture of 57 ml. of aqueous 1% sodium hydroxide and 150 ml. of water. The resulting aqueous extract was saturated with sodium chloride, mixed with 50 ml. of n-butyl alcohol, and acidified to pH 2.5 with 9.5 ml. of 20% orthophosphoric acid. After the mixture had been thoroughly agitated, the layers were separated, and the n-butyl alcohol layer, now containing the greater portion of the penicillin, was neutralized to pH 6.8 with 8.3 ml. of aqueous 20% rubidium carbonate solution. The neutralized solution was dehydrated and concentrated under vacuum until crystallization began. After the crystallization was complete, the crystals were separated by filtration and were then washed successively with n-butyl alcohol and acetone, and dried. The yield of crystalline rubidium penicillin was 2.0261 grams, assaying 1415 units per milligram, and corresponding to a conversion of 65%, based on the penicillin in the n-butyl acetate solution.

While the above describes the preferred embodiments of my invention, it will be understood that departures may be made therefrom within the scope of the specification and claims.

This is a continuation of my application Serial No. 618,410, filed September 24, 1945.

In accordance with the foregoing specification, I claim as my invention:

1. In a process for preparing pure, crystalline salts of penicillin, the steps which comprise acidifying an aqueous solution of penicillin salts containing at least about 15,000 Oxford units of penicillin activity per milliliter and adding thereto a salting-out agent selected from the group consisting of water-soluble alkali-metal, alkaline-earth-metal, and ammonium salts having inorganic anions, extracting the acid form of penicillin therefrom with a hydrophilic, organic solvent for penicillin and penicillin salts, said solvent being immiscible with said acidified aqueous solution of penicillin salts in the presence of said salting-out agent, adding an alkali selected from the group consisting of the hydroxide, carbonate and bicarbonate of the desired cation to convert the penicillin in the resulting organic-solvent solution into the desired penicillin salt, dehydrating and concentrating said solution by distilling under reduced pressure and at temperatures below about 40° C., and crystallizing a pure penicillin salt therefrom.

2. In a process for preparing pure, crystalline salts of penicillin, the steps which comprise acidifying an aqueous solution of penicillin salts containing at least about 15,000 Oxford units of penicillin activity per milliliter to a pH between about 2 and 4 and adding thereto a salting-out agent selected from the group consisting of water-soluble alkali-metal, alkaline-earth metal, and ammonium salts having inorganic anions, extracting the acid form of penicillin therefrom with a hydrophilic, organic solvent for penicillin and penicillin salts, said solvent being immiscible with said acidified aqueous solution of penicillin salts in the presence of said salting-out agent adding an alkali selected from the group consisting of the hydroxide, carbonate and bicarbonate of the desired cation to convert the penicillin in the resulting organic-solvent solution into the desired penicillin salt, and crystallizing a pure penicillin salt therefrom.

3. In a process for preparing pure, crystalline salts of penicillin, the steps which comprise acidifying an aqueous solution of penicillin salts containing at least about 15,000 Oxford units of penicillin activity per milliliter to a pH between about 2 and 4 and adding thereto a salting-out agent selected from the group consisting of water-soluble alkali-metal, alkaline-earth metal, and ammonium salts having inorganic anions, extracting the acid form of penicillin therefrom with an alcohol solvent immiscible with said acidified aqueous solution of penicillin salts in the presence of said salting-out agent, adding an alkali selected from the group consisting of the hydroxide, carbonate and bicarbonate of the desired cation to convert the penicillin in the resulting alcohol solution into the desired penicillin salt, dehydrating and concentrating said solution by distilling at temperatures below about 40° C., and crystallizing a pure penicillin salt therefrom.

4. In a process for preparing pure, crystalline salts of penicillin, the steps which comprise acidifying an aqueous solution of penicillin salts containing at least about 15,000 Oxford units of penicillin activity per milliliter to a pH between about 2 and 4 and adding thereto a salting-out agent selected from the group consisting of water-soluble alkali-metal, alkaline-earth-metal, and ammonium salts having inorganic anions, extracting the acid form of penicillin therefrom with a lower aliphatic alcohol, adding an alkali selected from the group consisting of the hydroxide, carbonate and bicarbonate of the desired cation to convert the resulting alcohol solution, dehydrating and concentrating said solution by distilling at temperatures below about 40° C., and crystallizing the desired pure penicillin salt therefrom.

5. The process of claim 4 in which the aliphatic alcohol is n-butyl alcohol.

6. The process of claim 4 in which the aliphatic alcohol is secondary butyl alcohol.

7. The process of claim 4 in which the aliphatic alcohol is n-amyl alcohol.

8. In a process for preparing pure, crystalline potassium penicillin, the steps which comprise acidifying an aqueous solution of penicillin salts containing at least about 15,000 Oxford units of penicillin activity per milliliter to a pH between about 2 and 4, adding thereto a salting-out agent selected from the group consisting of water-soluble alkali-metal, alkaline-earth-metal, and ammonium salts having inorganic anions, extracting the acid form of penicillin therefrom with an alcohol solvent immiscible with said acidified aqueous solution of penicillin salts in the presence of said salting-out agent, neutralizing the penicillin in the resulting extract by adding an alkaline potassium compound selected from the group consisting of the hydroxide, carbonate and bicarbonate, dehydrating and concentrating the resulting solution by distilling under reduced pressure and at temperatures below about 40° C., and crystallizing substantially pure potassium penicillin therefrom.

9. In a process for preparing pure, crystalline potassium penicillin, the steps which comprise acidifying an aqueous solution of penicillin salts containing at least about 15,000 Oxford units of penicillin activity per milliliter with orthophosphoric acid to a pH between about 2 and 3, adding an alkali-metal chloride thereto, extracting the acid form of penicillin therefrom with n-butyl alcohol, neutralizing the resulting extract by adding potassium hydroxide, dehydrating and concentrating the resulting solution by distilling at temperatures below about 40° C., and crystallizing substantially pure potassium penicillin therefrom.

10. In a process for preparing pure, crystalline ammonium penicillin, the steps which comprise acidifying an aqueous solution of penicillin salts containing at least about 15,000 Oxford units of penicillin activity per milliliter to a pH between about 2 and 4, adding thereto a salting-out agent selected from the group consisting of water-soluble alkali-metal, alkaline-earth-metal, and ammonium salts having inorganic anions, extracting the acid form of penicillin therefrom with an alcohol solvent immiscible with said acidified aqueous solution of penicillin salts in the presence of said salting-out agent, neutralizing the penicillin in the resulting extract by adding an alkaline ammonium compound selected from the group consisting of the hydroxide, carbonate and bicarbonate, dehydrating and concentrating the resulting solution by distilling at temperatures below about 40° C., and crystallizing substantially pure ammonium penicillin therefrom.

11. In a process for preparing pure, crystalline ammonium penicillin, the steps which comprise acidifying an aqueous solution of penicillin salts containing at least about 15,000 Oxford units of penicillin activity per milliliter with orthophosphoric acid to a pH between about 2 and 3, adding an alkali-metal chloride thereto, extracting the acid form of penicillin therefrom with n-butyl alcohol, neutralizing the resulting extract by adding ammonium hydroxide, dehydrating and concentrating the resulting solution by distilling under reduced pressure and at temperatures below about 40° C., and crystallizing substantially pure ammonium penicillin therefrom.

12. In a process for preparing pure, crystalline sodium penicillin, the steps which comprise acidifying an aqueous solution of penicillin salts containing at least about 15,000 Oxford units of penicillin activity per milliliter to a pH between about 2 and 4, adding thereto a salting-out agent selected from the group consisting of water-soluble alkali-metal, alkaline-earth-metal, and ammonium salts having inorganic anions, extracting the acid form of penicillin therefrom with an alcohol solvent immiscible with said acidified aqueous solution of penicillin salts in the presence of said salting-out agent, neutralizing the penicillin and the resulting extract by adding an alkaline sodium compound selected from the group consisting of the hydroxide, carbonate and bicarbonate, dehydrating and concentrating the resulting solution by distilling at temperatures below about 40° C., and crystallizing substantially pure sodium penicillin therefrom.

13. In a process for preparing pure, crystalline sodium penicillin, the steps which comprise acidifying an aqueous solution of penicillin salts containing at least about 15,000 Oxford units of penicillin activity per milliliter with orthophosphoric acid to a pH between about 2 and 3, adding an alkali-metal chloride thereto, extracting the acid form of penicillin therefrom with n-butyl alcohol, neutralizing the resulting extract by adding sodium hydroxide, dehydrating and concentrating the resulting solution by distilling at temperatures below about 40° C., and crystallizing substantially pure sodium penicillin therefrom.

14. In a process for preparing pure, crystalline salts of penicillin, the steps which comprise preparing an aqueous solution of the acid form of penicillin containing at least about 15,000 Oxford units of penicillin per milliliter, adding thereto a salting-out agent selected from the group consisting of water-soluble alkali-metal, alkaline-earth metal, and ammonium salts having inorganic anions, extracting the penicillin therefrom with an organic solvent for penicillin and penicillin salts, said solvent being immiscible with said acidified aqueous solution of penicillin salts in the presence of said salting-out agent, dehydrating and concentrating said extract by distilling under reduced pressures and at temperatures below about 40° C., adding an alkali selected from the group consisting of the hydroxide, carbonate and bicarbonate of the desired cation to convert the penicillin in the resulting concentrate into the desired penicillin salt, and crystallizing a pure penicillin salt therefrom.

15. In the preparation of crystalline penicillin salts, the process which comprises preparing an aqueous solution of penicillin containing at least about 15,000 Oxford units per milliliter, acidifying said solution to bring it to a pH within the range of about 2 to 4, adding a hydrophilic organic solvent immiscible with said acidified aqueous solution of penicillin in the presence of a salting-out agent and a sufficient quantity of a salting out agent, selected from the group consisting of water-soluble alkali-metal, alkali-earth-metal, and ammonium salts having inorganic anions to produce an aqueous layer having a salt concentration of at least about 25 per cent by weight, separating the organic solvent layer containing penicillin in its acid form, adding an alkali selected from the group consisting of the hydroxide, carbonate and bicarbonate of the desired cation to convert the penicillin into the desired salt, dehydrating and concentrating the salt solution by distilling under reduced pressure and at temperature below about 40° C., and crystallizing the said penicillin salt therefrom.

EDWARD B. HODGE.

REFERENCES CITED

The following references are of record in the file of this patent:

UNITED STATES PATENTS

| Number | Name | Date |
|---|---|---|
| 2,461,949 | Wintersteiner et al. | Feb 15, 1949 |
| 2,480,991 | Wintersteiner et al. | Sept. 6, 1949 |

FOREIGN PATENTS

| Number | Country | Date |
|---|---|---|
| 578,590 | Great Britain | July 4, 1946 |

OTHER REFERENCES

Systematic Organic Chemistry, Cummings, Wheeler and Hopper, Constable & Company (1931), page 34.

Science, July 3, 1942, pages 20 and 21.

Summary of Purification and Chemical Studies on Penicillin up to December 24, 1943. Pages 1-5.

Hougen et al., "Chemical Process Principles," part I (1943), page 123.

Examination of Penicillin Mother Liquors, Pfizer & Company, page 2, Pfizer & Company January 2, 1944.

Nature, October 7, 1944.